United States Patent [19]

Schröter

[11] 3,998,119

[45] Dec. 21, 1976

[54] PROCESS AND APPARATUS FOR PUNCHING SHEETS OR WEBS OF PAPER, CARDBOARD OR SIMILAR MATERIAL

[76] Inventor: Friedrich Schröter, Am Waldchen 8, 3004 Isernhagen NB-Sud, Germany

[22] Filed: Aug. 4, 1975

[21] Appl. No.: 601,525

Related U.S. Application Data

[62] Division of Ser. No. 418,130, Nov. 21, 1973, abandoned.

[52] U.S. Cl. .................................... 83/328; 83/38

[51] Int. Cl.$^2$ .................................... B23D 25/04

[58] Field of Search ................ 83/37, 38, 321, 327, 83/328, 284, 588

[56] References Cited

UNITED STATES PATENTS

| | | | |
|---|---|---|---|
| 2,153,524 | 4/1939 | Schmidt | 83/327 |
| 3,765,286 | 10/1973 | Vossen | 83/284 |

*Primary Examiner*—Leonidas Vlachos

*Assistant Examiner*—W. R. Briggs

[57] ABSTRACT

In a cutting apparatus or punch press for repeatedly cutting or punching a work shape from a continuously travelling web or sheet of paper, cardboard or similar material, the cutting dies or punch tools are mounted for reciprocation longitudinally in the direction of feed of the web or sheet on press platens that open and close and sustain the punching forces but do not themselves move in the direction of feed. By means of a drive mechanism operating in synchronism with the opening and closing movements of the press platens the punch tools are accelerated from rest in the direction of feed to attain the speed of the work web or sheet at the instant of punching and then are decelerated to rest and moved in reverse back to the initial position of the cycle. The stroke of the reciprocation may be adjusted to suit different lengths of the work shape to be punched.

4 Claims, 3 Drawing Figures

PROCESS AND APPARATUS FOR PUNCHING SHEETS OR WEBS OF PAPER, CARDBOARD OR SIMILAR MATERIAL

This is a division of application Ser. No. 418,130, filed Nov. 21, 1973.

This invention relates to the cutting or punching of sheets or webs of paper, cardboard or the like.

Automatic punching machines having punch tools for punching paper, cardboard and similar materials operate mainly with intermittent feed of the material to a fixed punching unit, where punching occurs during dwell periods when there is no feed movement. The punching unit consists of a fixed support, and the punching head which can be moved at right angles to the plane of the material and upon which the punching tools are fixed. These machines have attained a high level of development and dominate the market. Also known are machines in which the punching operation is effected by the rolling motion of a cylinder or cylinder segment on the fixed support. Both constructions have the characteristic of intermittent feed of the material to be punched which is in sheet or web form.

The high level of development of the first design can be mainly seen in the high operating speed of the machines which in the last few years has experienced a steady rise. This has been attained by a favourable division of the operating cycle into a short as possible dwell time of the material for the punching operation and an extended movement time for the feed of the material, in order to keep the accelerative and decelerative forces in the feed system and in the punched material small.

The relative increase of the period of feed in the operating cycle cannot be continued indefinitely and it is at present limited by the comparatively low closing speed that a cyclically reciprocated punching member has just before dead centre, and the time necessary to ensure precise alignment of the material before punching or stamping occurs.

Despite this, in the future neither an increase in the high machine speed by raising the accelerative values nor an increase in the output of punched workpieces can be expected from a further constructional improvement of the feed drives. The material being punched in sheet or web form can only sustain rather small accelerative and decelerative forces during each feed step after punching since it breaks when a certain critical acceleration limit is exceeded. Thus, it has to be accepted that the fact of intermittent feed of the relatively low tensile sheet or web material prevents a further increase in production in automatic punching machines, even if in future it were mechanically possible to raise the machine speed still higher.

There has not been a shortage of experiments to replace the intermittent feed of the material, required for punching in a dwell or rest position, by working with constant feed. Punching on two-revolution cylinder presses, which was previously widespread, has the advantage of the continuous feed of the punched sheet. However it has lost popularity because the great weight of the carriage going to and fro only permits a low machine speed. Besides, the curve of the sheet around the cylinder makes an undesirably large number of clamping bars necessary to prevent the disintegration of the punched sheet.

It has also been suggested that a rotary movement around two eccentric shafts be executed on upper and lower platens in order to avoid the sheet material stopping. Because of the high punching pressure only a small eccentricity and consequently only a low peripheral speed of the upper and lower platens can be attained, which is only a function of the highest speed of the material. The advantage of this construction, since it has a highly variable feed speed, is only small in relation to machines with intermittent feed motion and it is only achieved with a great effort for the drive of the punch unit.

Further, it has been attempted to make a punch tool of chain form rotate with the speed of the constantly fed material web. This is not possible with all forms of shapes to be punched, besides which the production of the punch tool is expensive and difficult. Moreover, the polygon effect inherent in chains with very long links, which is the case here, does not permit high speeds.

Only the socalled swing punches have attained any importance. In these machines, upper and lower platens together execute a to and fro movement. When the platens carrying the punch tools in the direction of the constantly fed material have reached the speed of the material the punching takes place. This construction is only relevent for small punch sizes, because otherwise with the usual sheet speeds the inertia forces resulting from the acceleration and deceleration of the heavy punching units would no longer be controllable.

It is an object of the invention to provide a punching press, capable of punching sheets or webs of paper, cardboard or similar materials fed at constant speed, which operates satisfactorily in all sizes. This object is achieved by a press in which only the punching tools or cutting dies, with their mountings and guides, execute a to and fro movement in the material feed direction, to achieve matching of the tool speed to the material speed at the moment of punching, while the press beam of the punching unit, that is the elements substaining the bending moments from the punching pressure, is fixed. Since, especially with the use of lightweight cutting dies formed from sheet steel sections (hereinafter referred to as "jig saw dies"), the punching tools or dies only constitute a fraction of the weight of the punching unit as a whole (including the bending moment sustaining elements), it is possible to construct machines of any size according to the invention without the inertia forces resulting from the acceleration and deceleration of the tools or dies with their mountings and guides increasing intolerably.

The process according to the invention has firstly the advantage that all work damage caused by the intermittent feed of the material, which constitutes the greatest part of all damage to the work, is eliminated. The limitation in speed necessary, in most cases, to prevent the destruction of the punched material, is avoided by the process according to the invention. Moreover, the invention opens up a new field for further development to increase machine efficiency, because the previous acceleration barrier due to the low strength of the punched material no longer exists.

In the punching and printing of web material, the process according to the invention leads one to expect an immediate improvement in the previously unsatisfactory accuracy of registration between printing and punching, because the main cause of such registration errors previously was the intermittent feed movement.

The process according to the invention and a device suitable for its implementations are now described in more detail with reference to the accompanying drawings.

Figure 2:
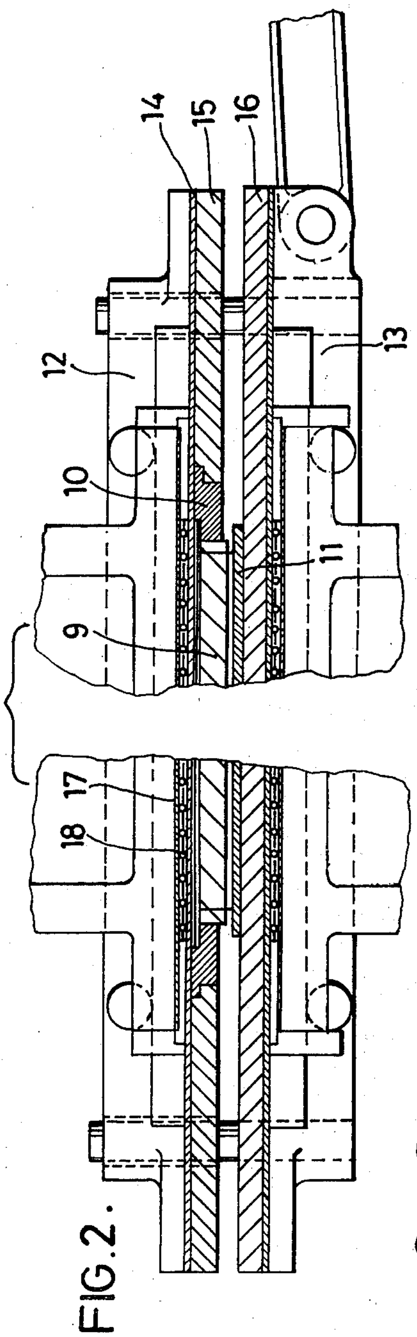
FIG. 2 is an enlarged detail of FIG. 1 which shows the punching tools with their mountings and guides.
Figure 3:
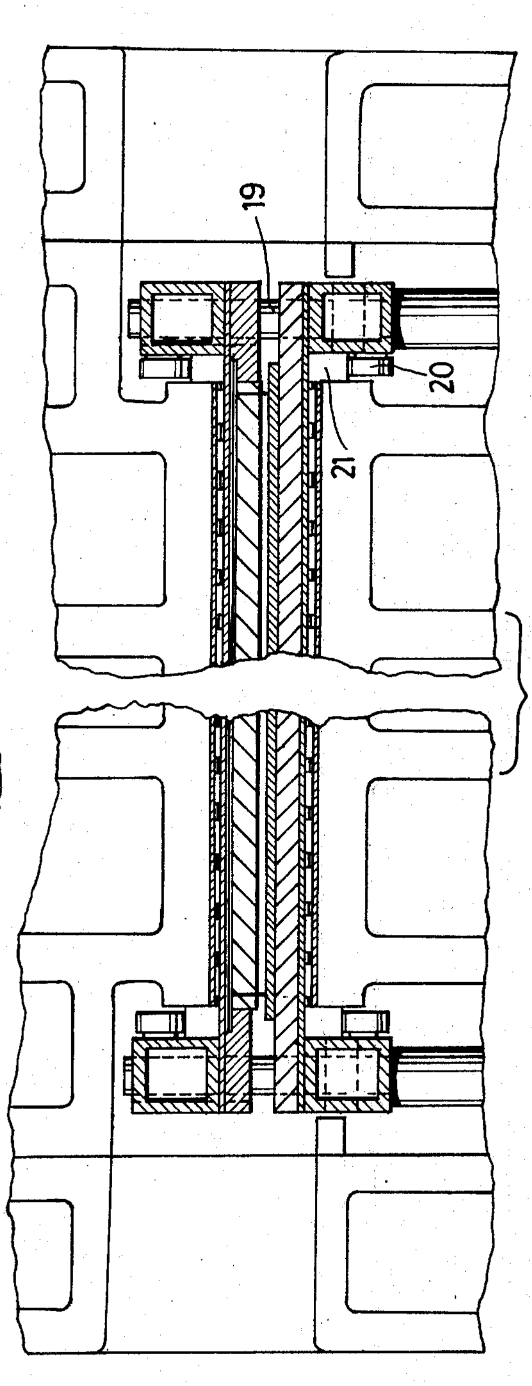
FIG. 3 is a cross section through the arrangements of FIG. 2.

In FIGS. 2 and 3 those parts which execute the to and fro movement are shown in thicker lines or hatched, whereas the fixed parts of the punch unit are represented in thinner lines and without hatching.

Figure 1:
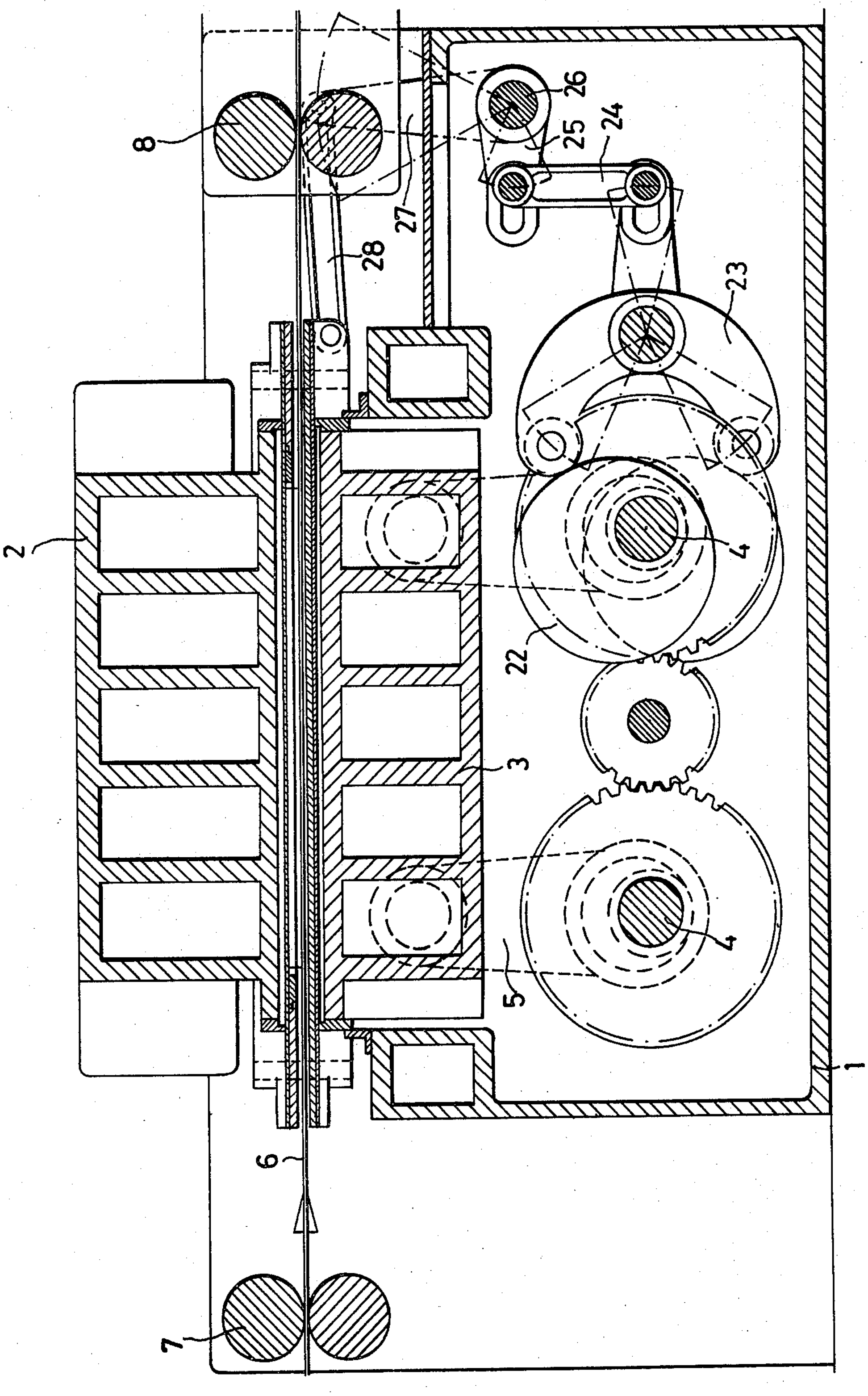
FIG. 1 shows schematically the total arrangement of a machine for punching a constantly fed continuous web of paper, cardboard or similar material, in the longitudinal section.

Referring firstly to FIG. 1, the cutting apparatus or press comprises a frame 1 to which is screwed fast a fixed upper platen 2, while a punch beam 3 under the upper platen is movable vertically, at right angles to the horizontal material feed direction, in guides (not shown), being driven by eccentrics on shafts 4 via connecting rods 5. The movable punch beam 3 is shown in its upper dead centre position at the moment of punching.

The continuous web of material 6 is fed into the press by a pair of rolls 7 at constant speed and, after punching, is further conveyed from the press by a pair of rolls 8 to a subsequent operation.

Referring now to FIGS. 2 and 3, a shaped an elongated cutting die or punching tool 9 in an enclosing lightweight frame 10, and a counter-punch plate 11, are contained in a longitudinally movable tool unit. This consists of a pair of longitudinal supports 12 and 13 running by means of rollers 20 along the upper and lower press platens respectively, and between which are carried, on the upper support 12, a plate assembly 15, that receives the punch tool frame 10, and, on the lower support 13, a plate 16 on which the counter-punch plate 11 is fixed.

The surfaces of the upper and lower platens 2, 3 facing one another are protected by hardened steel plates 17 which, together with further hardened steel plates 14 behind the plates 15 and 16, serve as tracks for needle roller bearings 18. The needle roller bearings 18 extend over approximately the same area as the punching tool shape and with little friction transfer the punching pressure from the tools to the upper and lower platens. Four vertical guide pillars 19 extending between the longitudinally moving supports 12, 13 ensure the exact positioning of the punch tool frame 10 and the counter-punch plate 11 in relation to one another, while permitting the punching movement of the lower tool. The guide rollers 20 of the longitudinally-moving supports 12, 13 run along guide rails 21 on the upper and lower platens 2, 3 and together with the needle bearings 18 prevent vertical movement of the upper and lower tools relatively to the upper and lower platens 2, 3, respectively.

The longitudinal movement of the tool unit is derived from the right hand eccentric shaft 4 (FIG. 1) via a set of cans 22 and an arcuately-forked lever 23 provided with cam-follower rollers. The opposite end of the roller lever 23 is coupled to a crank 25 by a link 24. The pivot points of the link 24 on the roller lever 23 and on the crank 25 are adjustable and allow variation of the stroke to suit various lengths of the shape to be punched. The crank 25 is fast on a control shaft 26 on which are mounted two upstanding pusher arms 27 coupled by substantially horizontal connecting rods 28 to the longitudinal support assembly 13.

The tool unit starts from rest at left hand dead centre, accelerates until it reaches the material web speed, travels for a short period in synchronism with the material web during which punching takes place, and then decelerates to stop at the right hand dead centre position, after which it accelerates and decelerates in the reverse direction in performing the return stroke to the left.

The device described for the implementation of the process according to the invention is adapted for punching a continuous web of material. The process is however also suitable for punching individual sheets of material for which the pairs of rolls 7 and 8 are removed and a system of gripper bars is provided, as is known for machines with intermittent feed movement; but here the feed system can be considerably simplified because it only has to effect a constant feed of the sheet. The adjustability of the stroke of the tool unit is also not necessary for punching individual sheets of material. Both arrangements can also be used for stamping or embossing like prior machines.

It will be understood that the machine described and shown in the drawings is only one non-limitative example of a press for implementing the invention and constructional changes will occur to and may be made by the worker skilled in the art without departing from the invention as defined hereinafter by the appended claims.

I claim:

1. In apparatus for cutting a pattern in a continuously moving sheet or web of material including a frame, means associated with said frame for advancing said material through said apparatus, a tool unit movably mounted to said frame for longitudinal reciprocation to and fro along the direction of advancement of said material through said apparatus, tool unit actuating means mounted to said frame and formed to selectively cause said tool unit to engage said material, and drive means operatively connected to said tool unit to reciprocate said tool unit in synchronism with the speed of advancement of said material through said apparatus and operatively connected to said tool unit actuating means to cause said tool unit to engage said material while in synchronism therewith, the improvement comprising:

said tool unit is formed as an assembly having a mass substantially less than the mass of said tool unit actuating means, and said assembly including a frame carrying a lightweight elongated cutting die defining the shape of the pattern and a pair of plates of relatively thin cross-section as compared to the cross-section of said tool unit actuating means, said plates being positioned on either side of said material between said tool unit actuating means and said tool unit to distribute and transmit cutting forces to said cutting die when supported by said tool unit actuating means, said tool unit being incapable of sustaining the bending moments produced by the cutting forces;

said tool unit actuating means is formed as a pair of bending moment sustaining platens positioned on opposite sides of said material and tool unit and having a high mass as compared to said tool unit, at least one of said platens being mounted to said frame for selective reciprocation in a direction transverse to the direction of advancement of said material through said apparatus, said bending moment sustaining platens being further formed to engage and uniformly support substantially the entire area of said cutting die during urging of said cutting die into engagement with said material for support of forces during cutting of said material by said bending moment sustaining platens.

2. In apparatus for cutting a pattern in a continuously moving sheet or web of material including a frame, means associated with said frame for advancing said material through said apparatus, a tool unit movably mounted to said frame for longitudinal reciprocation to and fro along the direction of advancement of said material through said apparatus, tool unit actuating means including a platen mounted to said frame for reciprocation into engagement with said tool unit to cause said tool unit to engage said material, and drive means including a tool unit reciprocating portion operatively connected to said tool unit to reciprocate said tool unit in synchronism with the speed of advancement of said material through said apparatus and including a movable platen driving portion operatively connected to said platen to cause said tool unit to engage said material while in synchronism therewith, the improvement comprising:

said drive means being formed to include a rotatably mounted cam means having a cam surface of predetermined configuration and known and fixed orientation with respect to the orientation of said platen driving portion, pivotally mounted lever means including a cam follower mounted in engagement with said cam surface, said cam means and said lever means being cooperatively formed to cause reciprocation of said lever means upon rotation of said cam means, and link means connecting said tool unit to said lever means and formed to transmit the reciprocal motion of said lever means to said tool unit to effect longitudinal reciprocation of said tool unit.

3. The apparatus as defined in claim 2 wherein:

said cam means is formed as a disc-like member eccentrically mounted to a rotatable drive element, said lever means is formed as a forked lever having a pair of spaced apart legs with a cam follower roller mounted on each of said legs for selective engagement of each of the follower rollers with said disc-like member to induce reciprocal pivoting of said lever means.

4. The apparatus as defined in claim 2 wherein:

said link means includes adjustment means formed for selective adjustment of the longitudinal distance travelled by said tool unit during reciprocation.

* * * * *